United States Patent [19]

Lindner et al.

[11] Patent Number: 4,873,289

[45] Date of Patent: Oct. 10, 1989

[54] GRAFT POLYMERS AND BLENDS THEREOF WITH POLYAMIDES

[75] Inventors: Christian Lindner, Koeln; Dieter Wittmann; Ludwig Trabert, both of Krefeld; Carlhans Süling; Herbert Bartl, both of Odenthal; Karl-Heinz Ott, Leverkusen, all of Fed. Rep. of Germany

[73] Assignee: Bayer Aktiengesellschaft, Leverkusen, Fed. Rep. of Germany

[21] Appl. No.: 246,887

[22] Filed: Sep. 15, 1988

Related U.S. Application Data

[63] Continuation of Ser. No. 878,278, Jun. 25, 1986, abandoned.

[30] Foreign Application Priority Data

Jul. 6, 1985 [DE] Fed. Rep. of Germany ....... 3524234

[51] Int. Cl.$^4$ ............................................. C08F 265/04
[52] U.S. Cl. ....................................... 525/293; 525/66; 525/242; 525/479
[58] Field of Search ........................ 525/242, 293, 479

[56] References Cited

U.S. PATENT DOCUMENTS 4,221,879  9/1978  Humme et al. .
4,519,929  5/1985  O'Brien et al. ...................... 525/296

FOREIGN PATENT DOCUMENTS 0001245  9/1978  European Pat. Off. .
0223005  9/1986  European Pat. Off. .

OTHER PUBLICATIONS

Steuben, K. C., "Ultraviolet Cured Pressure Sensitive Adhesives II, Monoacrylate Grafted Polyethers", Journal of Radiation Curing, vol. 9, (Apr. 1982), No. 2, pp. 20–23.

Primary Examiner—Lewis T. Jacobs
Assistant Examiner—A. Carrillo
Attorney, Agent, or Firm—Connolly and Hutz

[57] ABSTRACT

The invention relates to new graft polymers based on elastomers as the graft base and grafted-on vinyl monomers, their preparation and blend thereof with polyamides.

19 Claims, No Drawings

GRAFT POLYMERS AND BLENDS THEREOF WITH POLYAMIDES

This application is a continuation of application Ser. No. 878,265, filed June 25, 1986, now abandoned.

The invention relates to new graft polymers based on elastomers as the graft base and grafted-on vinyl monomers, their preparation and blend thereof with polyamides.

These new graft copolymers are prepared, in particular, from 1. an elastomer component with glass transition temperatures $<0°$ C., in particular $<-20°$ C., as the graft base, and 2. grafting monomers of the general formula I

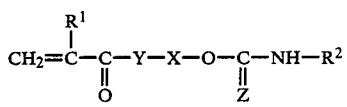

in which
- $R^1$ represents H or a $C_1$-$C_4$-alkyl radical, preferably H or $CH_3$,
- $R^2$ represents a $C_1$-$C_{20}$-alkyl or $C_6$-$C_{18}$-aryl radical, which can optionally be substituted with alkyl groups or groups containing O or N,
- Y represents an —O— or an —NH— group, preferably —O—,
- X represents a $C_2$-$C_{10}$-alkylene radical, preferably a $C_2$-$C_6$-alkylene radical and
- Z represents O or S, preferably O, and mixture thereof with polyamides.

Particularly suitable grafting monomers of the general formula (I) are addition products of hydroxyalkyl esters of acrylic acid or methacrylic acid and monoisocyanates, such as, for example

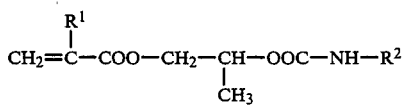

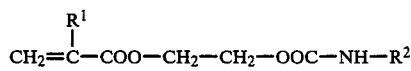

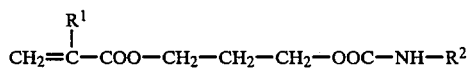

Particularly preferred compounds (I) are those which contain in the molecule urethane groups which are derived from an aliphatic monoisocyanate, such as, for example, addition products of hydroxyalkyl esters of (meth)-acrylic acid and alkyl isocyanates, in particular based on ethyl, propyl or cyclohexyl isocyanate, stearyl isocyanate or tert.-butyl isocyanate.

Preferred graft polymers are prepared from 8 to 85% by weight, preferably 50 to 75% by weight, of the graft base and 92 to 15% by weight, preferably 50 to 25% by weight, of monomers to be grafted on, consisting of 0.1 to 100% by weight, preferably 0.5 to 20% by weight, of monomers of the general formula (I) and 0 to 99.9% by weight, preferably 99.5 to 80% by weight, of other $\alpha,\beta$-unsaturated monomers.

The olefinically monounsaturated monomers which can be used, if appropriate, for the grafting copolymerization as a mixture with at least one monomer (I) are those which can undergo free radical polymerization and are capable of copolymerization with the monomers of the formula (I). Vinyl or vinylidene monomers are preferably employed, and particularly preferably monomers from the class of styrenes, such as styrene, α-methylstyrene, p-methylstyrene and halogenostryenes, $\alpha,\beta$-unsaturated nitriles, such as acrylonitrile or methacrylonitrile, acrylates, such as acrylic acid alkyl esters with up to 12 C atoms in the ester group and the corresponding methacrylates, methacrylic acid, acrylic acid, acrylamide, methacrylamide, vinyl acetate, vinyl propionate, α-olefines, such as ethylene, propylene and butadiene, chloroprene, vinyl chloride and also maleic acid derivatives, such as maleic anhydride.

The elastomer components present in the graft copolymers according to the invention are elastomers with glass transition temperatures $<0°$ C., in particular $<-20°$ C., such as, for example, elastomers from the series of diene rubbers, preferably polybutadiene, polychloroprene or polyisoprene, olefine rubbers, such as, for example, ethylene polymers, ethylene/vinyl acetate copolymers, ethylene/acrylate copolymers and EPDM rubbers, silicone rubbers or acrylates rubbers, preferably homo- or copolymers of acrylic acid alkyl esters with up to 12 C atoms in the ester group, which can be copolymerized with polyfunctional unsaturated monomers for possible crosslinking. Preferred rubber components are polybutadienes and copolymers thereof with styrene or acrylonitrile, as well as acrylate rubbers. The elastomers can be in non-crosslinked, partly crosslinked or highly crosslinked form. Elastomers which are at least up to 20%, in particular 50%, partly crosslinked are particularly preferred.

Elastomers which have an average particle size of 0.05 to 8 μm ($d_{50}$ value), preferably 0.08 to 1 μm, are particularly preferred. The particle size is determined by ultracentrifuge measurement.

Particularly suitable rubbers are polybutadienes or copolymers thereof with particle sizes of 0.09 to 0.6 μm and gel contents >50% by weight, as well as alkyl acrylate rubbers with particle sizes of 0.09 to 0.6 μm and gel contents >20% by weight, preferably >80% by weight; the latter are particularly advantageous if they have a so-called core-shell structure, that is to say they contain a core of polymer different from acrylate rubber. This core is surrounded by a shell of crosslinked alkyl acrylate rubber, onto which the monomers (I), if appropriate in combination with other monomers, are then grafted.

Preferred graft copolymers according to the invention are in particle form with a particle size ($d_{50}$) of 0.05 to 8 μm, are at least partly crosslinked and are derived from diene or alkyl acrylate rubbers.

The graft polymers according to the invention are prepared by subjecting at least one monomer (I), if appropriate in combination with other ethylenically unsaturated monomers, to free radical grafting copolymerization in the presence of an elastomer.

Non-crosslinked or at least partly crosslinked rubbers can be employed in this process for grafting copolymerization; if non-crosslinked rubbers are employed, the grafting copolymerization can be carried out so that crosslinking of the rubbers also takes place to the desired degree during grafting.

The grafting can be carried out at temperatures from 20° C. to 170° C., preferably 50° C. to 100° C. The process can be carried out in bulk, in solution or in dispersion or suspension. Dispersion, precipitation and suspension polymerization are preferred; emulsion polymerization is a particularly preferred process. The polymerization processes can be carried out in organic media or in aqueous media. If the preferred emulsion polymerization is carried out to prepare the graft copolymers according to the invention, an emulsion of a rubber, the emulsion particle size of which is within the scope of the invention, is advantageously used in the initial mixture, otherwise the rubber particles can also be increased to a desired particle size by known agglomeration processes before or after the grafting copolymerization.

Grafting is carried out under free radical conditions; it can be carried out by also using initiators which produce free radicals, such as proxides, azo compounds, hydroperoxides or peresters. So-called regulators can furthermore also be used, such as, for example, mercaptans. In the case of dispersion or suspension polymerization, the customary auxiliaries, such as known dispersing or suspending agents or emulifiers, can be used. If the grafting is carried out in media, the grafting copolymerization should be effected at pH values from 12 to 2.

The polymerization process can be carried out batchwise, discontinuously or completely continuously.

In this process, the monomers (I), if appropriate mixed with other monomers, are subjected to free radical grafting copolymerization in the presence of the elastomeric graft base. At least some of the monomer is thereby grafted onto the elastomer. This grafting is determined quantitatively within wide ranges of grafting yield or degree of grafting. Graft polymers according to the invention are therefore understood as products which contain the graft copolymers and homo- or copolymers of the monomers to be grafted on.

After the grafting polymerization, the polymers can be worked up by conventional processes, such as, for example, by filtration, coagulation, spray drying and evaporation. Working up at pH values of <7 is particularly suitable. Such a control on working up is unnecessary if grafting has already been established at pH values <7, preferably 4 to 6. Before further processing, fillers, stabilizers, plasticizers, pigments and antioxidants can be added to the graft polymers, according to the technical use for which the polymers are intended.

The invention furthermore relates to thermoplastic polyamide moulding materials containing the graft copolymers according to the invention.

Such moulding compositions are distinguished by surprisingly good tough fracture properties at low temperatures, depending on the modifier content; a decrease in the toughness properties occurs only below a temperature of −40° C.

Compared with already known moulding materials of polyamides and graft copolymers with incorporated urethane groups but with a different chemical structure from the monomers of the formula (I), the moulding materials according to the invention have improved flow properties and an increased heat stability during processing. The invention thus relates to thermoplastic polyamide moulding materials of: A. 65 to 97, preferably 70 to 95 and particularly preferably 75 to 80% by weight, based on components A and B, of a polyamide and of B. 3 to 35, preferably 5 to 30 and particularly preferably 10 to 25% by weight of a graft copolymer, described above, in particle form according to the invention.

Suitable polyamides A are all the thermoplastic polyamides, preferably partly crystalline polyamides. Thus, polyamide 6, polyamide 66 or copolyamides thereof can be employed as partly crystalline polyamides for the moulding materials according to the invention. Partly crystalline polyamides in which the acid component consists completely or partly of terephthalic acid and/or isophthalic acid and/or suberic acid and/or sebacic acid and/or azelaic acid and/or adipic acid and/or cyclohexanedicarboxylic acid and the diamine component consists completely or partly of m- and/or p-xylylenediamine and/or hexamethylenediamine and/or 2,2,4-trimethylenehexamethylenediamine and/or 2,4,4-trimethylhexamethylenediamine and/or isophoronediamine, are furthermore possible.

Polyamides which have been prepared partly from lactams with 6 to 10 C atoms, also using one or more of the abovementioned starting components, are furthermore suitable.

Particularly preferred partly crystalline polyamides are polyamide 6 and polyamide 66 or mixtures thereof.

The thermoplastic polyamides should preferably have a relative viscosity (measured on a 1% strength by weight solution in m-cresol at 25° C.) of 2.0 to 5.0, preferably 2.5 to 4.0.

The polyamide moulding materials according to the invention can contain customary additives, such as lubricants and mould release agents, nucleating agents, stabilizers, fillers and reinforcing substances, flameproofing agents, preservatives and dyestuffs.

The filled or reinforced moulding materials can contain up to 60% by weight, based on the reinforced moulding materials, of fillers and/or reinforcing substances. Preferred reinforcing substances are glass fibres. Preferred fillers, which can also have a reinforcing action, are glass beads, mica, silicates, feldspar, quartz, talc, titanium dioxide and wollastonite.

The moulding materials equipped with flameproofing agents can contain these additives in a concentration of in general less than 30% by weight, based on the flameproofed moulding materials, and have a sufficient flame-repellancy.

All the known flameproofing agents, such as, for example, melamine and salts thereof, such as melamine cyanurate or melamine sulphate, or red phosphorus, are possible.

The moulding materials can be prepared in the customary mixing units, such as roll mills, kneaders and single- and multi-screw extruders.

Although in most cases all the components are advantageously mixed in one step, for some process methods it may be advisable to mix the components only in succession.

The moulding materials according to the invention can thus be prepared on the mixing units mentioned by melting the two components A and B together and homogenizing them or by incorporating the graft polymer B into the melt of the polyamide A.

The temperature during preparation of the mixtures should be at least 10° C. and advantageously not more than 80° C. above the melting point of the polyamide.

The moulding materials according to the invention are distinguished by an excellent toughness and very good flow properties.

The moulding materials according to the invention are suitable, above all because of these properties, for the production of injection-moulded and extrusionmoulded articles, above all in the automobile field for bumpers and body components.

Examples

A. Components used Graft polymers according to the invention

I. Polyamide 6 with a relative viscosity (measured on a 1% strength by weight solution in m-cresol at 25° C.) of 3.0

II. Polyamide 66 with a relative viscosity of 3.0, measured as for I

III. Polyamide of isophthalic acid and hexamethylenediamine ($\eta_{rel}$ 2.68 measured as for I)

IV. Graft copolmers

IV.1 Graft bases:

IV.1.1 Polybutadiene with an average particle size of 0.4 μm ($d_{50}$ value) and a gel content of 87% by weight in the form of an aqueous emulsion with a polymer solids content of 49% by weight.

IV.1.2 Polybutyl acrylate with an average particle size of 0.45 μm ($d_{50}$ value) and a gel content of 85% by weight (the gel content was established by copolymerization with triallyl cyanurate as a crosslinking comonomer). The rubber is in the form of an aqueous emulsion with a polymer solids content of 37% by weight.

IV.1.3 Ethylene/vinyl acetate copolymer with a vinyl acetate content of 30% by weight; the polymer is soluble in organic liquids and has no gel content. The polymer is in the form of an aqueous emulsion; the emulsion has a solids content of 37% by weight.

IV.2 Monomers for grafting:

The following compounds are employed as monomers:

N—Vinyl-methylurethane (Comparison)    (A)

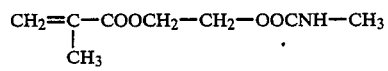 (B)

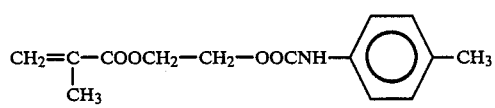 (C)

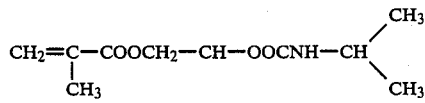 (D)

Examples 1–10

2,416 parts by weight of the rubber latex IV.1.1 and 850 parts by weight of water are initially introduced into a reactor. After the mixture has been heated up to 65° C., the polymerization is started by addition of 3.4 parts by weight of potassium peroxydisulphate, dissolved in 100 parts by weight of water.

Thereafter, the following streams are metered uniformly into the reactor at 65° C. in the course of 4 hours.

Monomer:
300 parts by weight
Emulsifier:
410 parts by weight of water,
22 parts by weight of the Na salt of disproportionated abietic acid
22 parts by weight of 1N sodium hydroxide solution

TABLE 1

| Example | Graft polymers Parts by weight of monomer | |
|---|---|---|
| IV.1 | 300 | methyl methacrylate (comparison) |
| IV.2 | 293 | methyl methacrylate (comparison) |
|  | 7 | A |
| IV.3 | 293 | methyl methacrylate |
|  | 7 | B |
| IV.4 | 293 | methyl methacrylate |
|  | 7 | C |
| IV.5 | 293 | methyl methacrylate |
|  | 7 | D |
| IV.6 | 216 | styrene |
|  | 84 | acrylonitrile (comparison) |
| IV.7 | 211 | styrene |
|  | 82 | acrylonitrile (comparison) |
|  | 7 | A |
| IV.8 | 211 | styrene |
|  | 82 | acrylonitrile |
|  | 7 | D |
| IV.9 | 291 | methyl methacrylate |
|  | 9 | B |
| IV.10 | 285 | methyl methacrylate |
|  | 15 | B |

After metering in the monomers listed in Table 1, the mixture is after-heated at 65° C. for a further 4 hours. The emulsion is then stabilized with 1.6 parts by weight, per 100 parts by weight of graft polymer, of phenolic antioxidants. For working up to powders, the emulsions are coagulated by means of an MgSO₄/acetic acid mixture at a pH value of 4 to 5 and the product is washed and dried.

Examples 11–13

5,797 parts by weight of the rubber latex I.1.2 and 1,000 parts by weight of water are initially introduced into a reactor. After the mixture has been heated up to 70° C., the polymerization is initiated by addition of 4 parts by weight of potassium peroxydisulphate, dissolved in 240 parts by weight of water. Thereafter, the following streams are metered uniformly into the reactor at 70° C. in the course of 5 hours.

Monomer:
920 parts by weight
Emulsifier:
792 parts by weight of water
14 parts by weight of the Na salt of C$_{16-18}$-alkylsulphonates

TABLE 2

| Examples | Graft copolymers Parts by weight of monomer | |
|---|---|---|
| IV.11 | 920 | methyl methacrylate (comparison) |
| IV.12 | 901 | methyl methacrylate |
|  | 19 | B |
| IV.12 | 893 | methyl methacrylate |
|  | 27 | B |

After metering in the monomers mentioned in Table 2, the mixture is after-heated at 70° C. for a further 4 hours. The emulsion is then stabilized with 1 part by weight, per 100 parts by weight of graft polymer, of phenolic antioxidants. For working up to powders, the emulsions are coagulated by means of MgSO₄ at pH values of about 5 and the products are washed and dried.

Examples 14–15

5,799 parts by weight of the rubber latex IV.1.3 and 1,000 parts by weight of water are initially introduced into a reactor. After the mixture has been heated up to 80° C., the polymerization is started by addition of 4 parts by weight of azoisobutyronitrile and 1 g of lauroyl peroxide, dissolved in 10 parts by weight of the monomer combinations according to Table 3. Thereafter, the following flow is metered uniformly into the reactor at 70° to 80° C. in the course of 5 hours:

Monomer:
920 parts by weight
4 parts by weight of azoisobutyronitrile

TABLE 3

| | Graft polymers |
|---|---|
| Examples | Parts by weight of monomer |
| IV.14 | 901 methyl methacrylate |
| | 19 B |
| IV.15 | 901 methyl methacrylate |
| | 19 C |

After metering in, the mixture is subsequently stirred at 80° C. for 6 hours. The emulsion is then coagulated at pH values of 7 with an NaCl/CaCl$_2$ mixture and the product is filtered, cleaned by washing with water and dried.

The graft polymers according to the invention can be isolated particularly well from aqueous emulsions, in contrast to the comparison products; during drying and dehydration by industrial units, they furthermore have improved dehydration properties. Their use as a blend with thermoplastics, such as polyamides, is particularly advantageous.

B. Preparation and testing of the polyamide moulding materials

Examples 17–30

The components were melted and homogenized in a continuously operating twin-screw extruder. The barrel temperatures were chosen so that the material temperatures stated in Table 4 were maintained. The melt strand was degassed before discharge from the nozzle, cooled in water, granulated and dried.

ASTM bars were produced from the moulding materials on an injection moulding machine. The notched impact strength according to Izod was tested at various temperatures and the brittle/tough transition was determined therefrom. The flow length was furthermore determined.

TABLE 4

Composition and properties of the moulding materials

| Examples | I/II/III Polyamide Type | % by weight | IV Grafted product according to Example | % by weight | Brittle/tough transition (°C.) | Flow spiral (cm) |
|---|---|---|---|---|---|---|
| 18[1] | I | 75 | IV.1 | 25 | −30 | 25 |
| 19 | I | 75 | IV.2 | 25 | −55 | 33 |
| 20 | I | 75 | IV.3 | 25 | −55 | 35 |
| 21 | I | 75 | IV.4 | 25 | −50 | 35 |
| 22 | I | 75 | IV.5 | 25 | −55 | 34 |
| 23[1] | II | 70 | IV.1 | 30 | −20 | 35 |
| 24 | II | 70 | IV.5 | 30 | −40 | 39 |
| 25[2] | III | 80 | IV.6 | 20 | −30 | 26 |
| 26[2] | III | 80 | IV.7 | 20 | −40 | 28 |
| 27[2] | III | 80 | IV.8 | 20 | −45 | 33 |
| 28[1] | I | 80 | IV.11 | 20 | +10 | 35 |
| 29 | I | 80 | IV.12 | 20 | −20 | 40 |
| 30 | I | 80 | IV.13 | 20 | −20 | 40 |

[1]Comparison examples
[2]The material temperature in the extruder and in the injection moulding machine was 245° C. The other material temperatures were 280° C.

We claim:

1. A graft polymer prepared under free radical conditions from a graft substrate (A) and grafting monomers (B) wherein (A) comprises an elastomer component which is at least one of diene rubbers, ethylene/vinyl acetate copolymers, ethylene/acrylate copolymers, silicone rubbers, or acrylate rubbers which are partly crosslinked to a degree of at least 20% and having an average particle size of 0.05 to 8 μm determined by ultracentrifuge measurement, and a glass transition temperature less than −20° C., and (B) comprises grafting monomers of the formula $$CH_2=\overset{R^1}{\underset{}{C}}-\underset{\underset{O}{\parallel}}{C}-Y-X-O-\underset{\underset{Z}{\parallel}}{C}-NH-R^2 \quad (I)$$

in which
R$^1$ represents a hydrogen atom or a C$_1$–C$_4$-alkyl radical,
R$^2$ represents a C$_1$–C$_{20}$-alkyl or C$_6$–C$_{18}$-aryl radical, which is unsubstituted or substituted by alkyl groups or groups containing O or N,
Y represents an —O— or an —NH— group,
X represents a C$_2$–C$_{10}$-alkylene radical, and
Z represents O or S; or mixtures thereof with other olefinically unsaturated monomers.

2. A graft polymer according to claim 1, in which R$^1$ represents a hydrogen atom or a methyl group.

3. A graft polymer according to claim 1, in which Y represents —O—.

4. A graft polymer according to claim 1, in which X represents a C$_2$ to C$_6$ alkylene radical.

5. A graft polymer according to claim 1, in which Z represents an oxygen atom.

6. A graft polymer according to claim 1, prepared from 8 to 85% by weight of the graft substrate (A) and 92 to 15% by weight of monomers to be grafted on consisting of 0.1 to 100% by weight of monomers of the formula (I) and 0 to 99.9% by weight of other olefinically unsaturated monomers.

7. A graft polymer according to claim 6, prepared from 50 to 75% by weight of the graft substrate (A), and 50 to 25% by weight of monomers to be grafted on consisting of 0.5 to 20% by weight of monomers of the formula (I) and 99.5 to 80% by weight of other olefinically unsaturated monomers.

8. A graft polymer according to claim 1 wherein the grafting monomers (B) contain urethane moieties which are the addition products of hydroxyalkyl esters of (meth) acrylic acid and alkyl isocyanates.

9. A graft polymer according to claim 8 wherein the alkyl isocyanate is selected from the group consisting of ethyl isocyanate, propyl isocyanate, cyclohexyl isocyanate, stearyl isocyanate and t-butyl isocyanate.

10. A graft polymer according to claim 1 wherein the elastomeric component (A) is at least 50% crosslinked.

11. A graft polymer according to claim 1 wherein the elastomer component (A) is polybutadiene, polychloroprene, polyisoprene, butadiene/styrene copolymer, butadiene/acrylonitrile copolymer or a polyacrylate.

12. A graft polymer according to claim 1 wherein the elastomer component (A) is a butadiene polymer or copolymer with a particle size from 0.09 to 0.6 μm and a gel content of more than 50% by weight.

13. A graft polymer according to claim 1 wherein the elastomer component (A) is polyacrylate rubber with a particle size from 0.09 to 0.6 μm and a gel content of more than 20% by weight.

14. A graft polymer according to claim 13 which has a core-shell structure wherein the core is the elastomer (A) and the shell is polymerized grafting monomers (B).

15. A graft polymer according to claim 1 wherein the elastomer component (A) is particulate diene or acrylate rubber having a particle size from 0.05 to 8 μm.

16. A graft polymer according to claim 1 wherein graft substrate (A) is selected from the group consisting of polybutadiene, polychloroprene, polyisoprene, ethylene/vinyl acetate copolymers, ethylene/acrylate copolymers, EPDM rubbers, silicone rubbers and polymers of acrylic acid alkyl esters with up to 12 carbon atoms in the alkyl group.

17. A graft polymer as claimed in claim 16, wherein the graft substrate (A) is a polybutadiene or butadiene copolymers with particle sizes of 0.09 to 0.6 μm and gel contents >50% by weight, or (A) is an alkyl acrylate rubber with particle sizes of 0.09 to 0.6 μm and gel contents >20% by weight.

18. A graft polymer as claimed in claim 1, wherein the grafting monomers (B) comprise (i) monomers of the formula I which are addition products of hydroxyalkyl esters of (meth)-acrylic acid and alkyl isocyanates wherein the alkyl is ethyl, propyl, cyclohexyl, stearyl or tert.-butyl and (ii) additionally a vinyl or vinylidene monomer selected from the group consisting of styrene, α-methylstyrene, p-methylstyrene, halogeno-styrenes, acrylonitrile, methacrylonitrile, acrylic acid alkyl ester with up to 12 carbon atoms in the alkyl group, alkyl methacrylate having up to 12 carbon atoms in the alkyl group, methacrylic acid, acrylic acid, acrylamide, methacrylamide, vinyl acetate, vinyl propionate, ethylene, propylene, butadiene, chloroprene, vinyl chloride and maleic anhydride.

19. A graft polymer as claimed in claim 1 wherein the graft substrate (A) is EPDM rubber.

* * * * *